United States Patent Office 3,026,349
Patented Mar. 20, 1962

3,026,349
PRODUCTION OF TRANS-β-STYRYL-
THIOGLYCOLIC ACID
Walter D. Celmer, New London, Conn., assignor to Chas. Pfizer & Co., Inc., New York, N.Y., a corporation of Delaware
No Drawing. Filed Mar. 1, 1960, Ser. No. 11,963
3 Claims. (Cl. 260—470)

The present invention relates to a novel process for preparing trans-β-styrylthioglycolic acid and esters and salts thereof.

Prior to this invention, trans-β-styrylthioglycolic acid and functional derivatives thereof, such as salts, have been prepared by the reaction of phenylacetylene with an alkali metal salt of thioglycolic acid. This procedure (Holmberg, Arkiv Kemi 2, 567) produces a mixture of the cis- and trans-acids in unsatisfactory yield which is not easily separated.

Holmberg assigned no configuration to the products isolated but designated them only as A- and B-acids. However, on the basis of the higher wavelength of its absorption maximum ($\lambda_{max}$) in the ultraviolet, the B-acid is, in keeping with the observation that trans-isomers have a higher $\lambda_{max}$ than do the corresponding cis-isomers, assigned the trans-configuration.

Nucleophilic additions to acetylenic bonds in general occur in a stereospecific trans-manner in the presence of a basic catalyst. For example, the base catalyzed additions of p-toluenethiol and methanethiol to phenylacetylene produce cis-β-styryl-p-tolyl sulfide and cis-β-styrylmethylsulfide, respectively. (Truce, et al., J. Am. Chem. Soc. 78, 2756). The homogeneity of the products indicated that little or none of the other possible adducts are formed. Similarly, p-toluenethiol adds to 2-butyne under similar conditions to produce 2-p-tolyl-mercapto-trans-2-butene (Truce, et al. (loc. cit.)). Chloroacetylene and p-tolylmercaptoacetylene also undergo stereospecific trans-nucleophilic additions with alcoholic sodium p-toluenethiolate (Truce, et al., J. Am. Chem. Soc. 78, 2743) to produce cis-1-chloro-2-(p-tolylmercapto)ethene and cis-bis(p-tolylmercapto)ethene, respectively.

In each of the above cited cases, the orientation obtained is consistent with the nucleophilic character of the thiol addendum and the electronegative character of the phenyl as compared with the methyl substituent.

It has now been unexpectedly found that the addition of an ester of thioglycolic acid to phenylacetylene, either in the absence or presence of a solvent, produces predominantly, upon saponification with a metal hydroxide, the trans-isomer of β-styrylthioglycolic acid metal salt. Neutralization with acid produces the corresponding trans-acid.

It has been observed that the use of freshly distilled phenylacetylene, that is, phenylacetylene which is free or essentially free of peroxide-inhibitor reacts smoothly with the thioglycolic acid ester. The presence of a peroxide inhibitor appears to have no beneficial effect on the reaction.

The reaction is carried out by treating phenylacetylene, preferably freshly distilled, with the chosen ester of thioglycolic acid in a molar ratio of from about 1.0:1.0 to about 1.1 to 1.0, either in the absence or presence of a solvent.

It is, however, preferred to conduct the reaction in the presence of a reaction inert solvent, that is, a solvent which does not react with the reactants or product, since the reaction proceeds more smoothly and close temperature control is easily maintained. As solvents for this reaction, it is preferred to employ alkanols containing up to four carbon atoms although higher alkanols, ethers and aromatic hydrocarbons, such as benzene, toluene and xylene can also be used. Water miscible alkanols are preferred since they effectively bring about precipitation of the trans-β-styrylthioglycolic acid metal salt, from the saponification mixture. This is especially desirable when the sodium or potassium salts are prepared. When water immiscible solvents or solvents of low water solubility are used, it is desirable to remove the solvent prior to saponification in order to avoid a two phase reaction mixture and reduced yields. Phenylacetylene itself can be employed as solvent. In such cases, of course, the molar ratio of phenylacetylene: thioglycolic acid greatly exceeds the 1.1:1.0 molar ratio previously given. The amount of phenylacetylene used in such instances is determined by the solubility characteristics of the particular thioglycolic acid ester used but will be at least 1.0 mole per mole of thioglycolic ester. From a practical standpoint, a low molecular weight alkanol, that is, an alkanol containing up to four carbon atoms, is favored as solvent.

The reaction is best conducted at a temperature of from about 50° C. to about 143° C. the boiling point of phenylacetylene. Higher temperatures are operative but appear to offer no advantage. At lower temperatures reaction proceeds slowly or not at all. In most instances it is preferred to employ a reaction inert solvent which boils within this temperature range and to operate at the reflux temperature of the solvent.

A wide variety of esters of thioglycolic acid, for example alkyl containing up to twenty carbon atoms, aryl such as phenyl and aralkyl such as benzyl and phenethyl, are operative in the novel process of this invention. It is, however, preferred to utilize the lower alkyl esters of thioglycolic acid, that is, esters in which the ester moiety contains from one to four carbon atoms, since they are readily available and react smoothly and in good yield.

The saponification step can be accomplished by a variety of metal hydroxides, for example, alkali metal hydroxides and alkaline earth hydroxides whereby the salt corresponding to the metal hydroxide used is formed. It is preferred to employ potassium or sodium hydroxide for the saponification since the reaction proceeds rapidly, and smoothly and the resulting salts are easily isolated and purified.

The reaction proceeds, of course through formation of the trans-β-styrylthioglycolic acid ester. If desired, the ester can be isolated from the reaction mixture by removal of the solvent and distillation under reduced pressure. In order to preclude the possibility of intermediate formation of the cis-isomer followed by isomerization to the trans-isomer during reaction, the cis-(A) and trans-(B) acids, prepared as described by Holmberg, isolated via their barium salts, (loc. cit.) were converted to their ethyl esters, then saponified by means of potassium hydroxide. Isolation of the potassium salts, and from them the original free acids, demonstrated that isomerization had not occurred.

The following examples are provided by way of illustration, and are not intended to limit this invention, the scope of which is indicated by the appended claims.

EXAMPLE I

To a stirred solution of 102.0 g. of phenylacetylene in 400 ml. of isopropyl alcohol heated to reflux, there is added, over a 30 minute period, a solution of 120.0 g. of ethylthioglycolate in 400 ml. of isopropyl alcohol. The resulting mixture is refluxed and stirred for an additional 20 hours at the end of which time it is cooled to 20–25° C. A solution of 72.5 g. of potassium hydroxide (85% KOH) in 120 ml. of water is then added over a 30 minute period, the temperature being maintained at 20–25° C. with external cooling. Saponification proceeds rapidly and the potassium salt of trans-β-styrylthioglycolic acid separates out. The slurry is stirred at 25° C. for an additional 2 hours, then filtered and the filter cake washed with isopropyl alcohol. The product is dried at 70-75° C. under reduced pressure.

Infrared absorption shows the product to be free of the cis-isomer as evidenced by the absence of absorption bands at 11.92 mu. and 13.85 mu. which are characteristic of the cis-isomer. The A-form described by Holmberg (loc. cit.) is assigned the cis-configuration on the basis of the lower wavelength of its ultraviolet absorption maximum relative to that of the B-, or trans, form.

Substitution of sodium hydroxide for potassium hydroxide in the saponification step produces the sodium salt of trans-β-styrylthioglycolic acid. In like manner, the use of barium hydroxide and calcium hydroxide produces the corresponding barium and calcium salts of trans-β-styrylthioglycolic acid.

EXAMPLE II

*Purification of Trans-β-Styrylthioglycolic Acid Potassium Salt*

Potassium trans-β-styrylthioglycolic acid (279.5 g.) is dissolved in 2500 ml. of water at 70–75° C. The solution is treated with Darco G-60 and filtered. The filtrate and washings are concentrated under reduced pressure to a heavy slurry then cooled and allowed to stand at room temperature for 2 hours. The pure salt is collected by filtration, washed with isopropyl alcohol and dried.

Further concentration of the filtrate produces an additional crop. The total recovery is 82%.

EXAMPLE III

The procedure of Example I is repeated using the methyl, propyl, n-butyl, t-butyl, isobutyl, isopropyl and sec-butyl esters of thioglycolic acid as reactant and the alcohol corresponding to the ester group as solvent. The product of each reaction is identical to that of Example I.

EXAMPLE IV

Repetition of the procedure of Example I using ethyl alcohol as solvent in place of isopropyl alcohol produced essentially the same results.

EXAMPLE V

Phenylacetylene (47.6 lbs.) is charged to a 100 gallon reactor with isopropyl alcohol (22.4 gals.) and the solution heated to reflux. Ethylthioglycolate (56 lbs.) in 22.4 gals. of isopropyl alcohol is added over a 45 minute period and the mixture refluxed for 23 hours. The mixture is then cooled to room temperature and a solution of potassium hydroxide (31.8 lbs. of 90% flake KOH in 6.7 gals. of water) at 30° C. added over a 1.5 hour period. The potassium salt of trans-β-styrylthioglycolic acid separates out and, after an additional two hours stiring is removed by centrifugation. The cake is washed with 12 gals. of isopropyl alcohol and dried at 65–70° C.

For purification, 50 lbs. of the product is dissolved in 67 gals. of water at 70° C. and treated with 5 lbs. of Darco G-60. After a half hour, the slurry is filtered through a bed of diatomaceous earth and the filter bed washed with 6 gals. of hot water. Sixty gallons of a saturated potassium acetate solution are added to the combined filtrate and washings and the mixture chilled to 15–20° C. for 4 hours. The product is removed by centrifugation, washed with 20 gals. of isopropyl alcohol and dried under reduced pressure at 65–70° C. The product is 98–99% pure.

EXAMPLE VI

Ethylthioglycolate (120.1 g.) is added dropwise over a 30 minute period to phenylacetylene (112.3 g.) heated to reflux and the resulting mixture refluxed and stirred for 15 hours. The mixture is then distilled under reduced pressure until the ethyl glycolate and phenylacetylene are completely removed. The residue of trans-β-styrylthioglycolic acid ethyl ester is then saponified with potassium hydroxide as described in Example I.

The potassium salt is recovered by evaporation. Alternatively, the potassium salt is precipitated by the addition of a large volume of isopropyl alcohol and recovered by filtration.

In like manner, the isopropyl, n-butyl and sec-butyl esters are prepared and saponified to the potassium salt. The trans-β-styrylthioglycolic acid produced in each instance is free of the cis-isomer as determined by infrared analysis.

EXAMPLE VII

The procedure of Example VI is repeated using the following quantities of reactants:

| Phenyl Acetylene, g. | Ethyl thio Glycolate, g. | Molar Ratio | KOH (85%), g. | Water, ml. |
|---|---|---|---|---|
| 51.0 | 12.0 | 5:1 | 7.3 | 12 |
| 102.0 | 12.0 | 10:1 | 7.3 | 12 |

The trans-β-styrylthioglycolic acid potassium salt isolated is equal in quality to that of Example I.

What is claimed is:

1. A process for making the trans-isomer of a compound of the formula

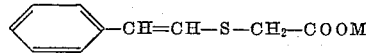

wherein M is selected from the group consisting of sodium, potassium, calcium and barium, which comprises: reacting phenylacetylene with a compound of the formula

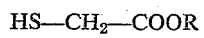

wherein R is alkyl of one to four carbon atoms, in a molar ratio of at least 1:1 and at a temperature of from about 50° C. to about 143° C.; saponifying the resulting trans-β-styrylthioglycolic acid ester with a metal hydroxide selected from the group consisting of sodium hydroxide, potassium hydroxide, barium hydroxide and calcium hydroxide, and recovering the thus produced metal salt therefrom.

2. The process of claim 1 wherein the reaction is carried out in the presence of a water miscible alkanol of one to four carbon atoms.

3. A process for making the trans-isomer of a compound of the formula:

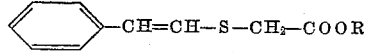

wherein R is alkyl of one to four carbon atoms which comprises: reacting phenylacetylene with a compound of the formula

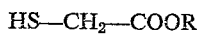

wherein R has the same significance as above, in a molar ratio of at least 1:1 and at a temperature of from about 50° C. to about 143° C. and recovering the product therefrom.

References Cited in the file of this patent

UNITED STATES PATENTS 2,559,521    Smith et al.   ———————— July 3, 1951

OTHER REFERENCES

Holmberg: Chem. Abst., vol. 46, page 100 (1952).
Truce et al.: J. Am. Chem. Soc., vol. 78, page 2747–8 (1956).
Truce et al.: J. Am. Chem. Soc., vol. 78, page 2756–7 (1956).